US00RE48966E

(19) United States
(12) Reissued Patent
Kroeger et al.

(10) Patent Number: US RE48,966 E
(45) Date of Reissued Patent: Mar. 8, 2022

(54) TIME-ALIGNMENT MEASUREMENT FOR HYBRID HD RADIO™ TECHNOLOGY

(71) Applicant: Ibiquity Digital Corporation, Columbia, MD (US)

(72) Inventors: Brian W. Kroeger, Sykesville, MD (US); Paul J. Peyla, Elkridge, MD (US)

(73) Assignee: Ibiquity Digital Corporation, Columbia, MD (US)

(21) Appl. No.: 16/682,345

(22) Filed: Nov. 13, 2019

Related U.S. Patent Documents

Reissue of:
(64) Patent No.: 9,832,007
Issued: Nov. 28, 2017
Appl. No.: 15/099,233
Filed: Apr. 14, 2016

(51) Int. Cl.

| | |
|---|---|
| ***H03D 3/00*** | (2006.01) |
| ***H04L 7/00*** | (2006.01) |
| ***H04L 12/18*** | (2006.01) |
| ***H04H 20/30*** | (2008.01) |
| ***H04H 40/00*** | (2009.01) |
| ***H04H 40/18*** | (2008.01) |
| ***H04H 60/00*** | (2009.01) |
| ***H04H 60/12*** | (2008.01) |

(52) U.S. Cl.
CPC ..... *H04L 7/0041* (2013.01); *H04H 20/30* (2013.01); *H04H 40/00* (2013.01); *H04H 40/18* (2013.01); *H04H 60/00* (2013.01); *H04H 60/12* (2013.01); *H04L 12/18* (2013.01); *H04H 2201/18* (2013.01)

(58) Field of Classification Search
CPC ..... H04H 20/30; H04H 60/12; H04H 60/00; H04H 40/18; H04H 40/00; H04H 2201/18; H04L 12/18; H04L 7/0041
See application file for complete search history.

(56) References Cited

U.S. PATENT DOCUMENTS 6,178,317 B1 1/2001 Kroeger et al.
6,347,120 B1 2/2002 Sakoda
(Continued)

FOREIGN PATENT DOCUMENTS

JP 2013084334 A 5/2013
KR 20080007454 A 1/2008

OTHER PUBLICATIONS

"U.S. Appl. No. 16/284,586, Notice of Allowance dated Jan. 24, 2020", 10 pgs.

(Continued)

*Primary Examiner* — Yuzhen Ge
(74) *Attorney, Agent, or Firm* — Schwegman Lundberg & Woessner, P.A.

(57) ABSTRACT

A method for processing a digital audio broadcast signal in a radio receiver, includes: receiving a hybrid broadcast signal; demodulating the hybrid broadcast signal to produce an analog audio stream and a digital audio stream; and using a normalized cross-correlation of envelopes of the analog audio stream and the digital audio stream to measure a time offset between the analog audio stream and the digital audio stream. The time offset can be used to align the analog audio stream and the digital audio stream for subsequent blending of an output of the radio receiver from the analog audio stream to the digital audio stream or from the digital audio stream to the analog audio stream.

15 Claims, 10 Drawing Sheets

(56) References Cited

U.S. PATENT DOCUMENTS 6,590,944 B1 7/2003 Kroeger
6,735,257 B2 5/2004 Kroeger
6,774,834 B2 8/2004 Dartois
6,836,520 B1 12/2004 Chen et al.
6,901,242 B2 5/2005 Kroeger et al.
6,982,948 B2 1/2006 Kroeger et al.
7,209,531 B1 4/2007 Katz et al.
7,546,088 B2 * 6/2009 Kroeger ..... H04H 20/30 375/322
7,733,983 B2 6/2010 Kroeger et al.
7,839,191 B2 11/2010 Takai
7,933,368 B2 * 4/2011 Peyla ..... H04L 1/20 375/343
8,014,446 B2 * 9/2011 Shah ..... H04H 60/27 348/389.1
8,180,470 B2 5/2012 Pahuja
8,310,384 B2 11/2012 Yeh et al.
8,408,061 B2 * 4/2013 Thomas ..... G01N 27/90 73/602
8,724,757 B2 5/2014 Cochran
8,811,757 B2 * 8/2014 Batur ..... H04N 19/80 375/240.27
8,830,224 B2 9/2014 Zhao et al.
8,976,969 B2 3/2015 Elenes et al.
9,054,905 B2 6/2015 Sen et al.
9,560,461 B2 1/2017 Davis et al.
9,634,704 B2 4/2017 Kroeger et al.
9,832,007 B2 11/2017 Kroeger et al.
10,177,729 B1 1/2019 Pahuja et al.
10,225,070 B2 3/2019 Kroeger et al.
10,666,416 B2 5/2020 Kroeger et al.
2003/0017832 A1 * 1/2003 Anderson ..... G01S 5/10 455/456.1
2004/0043730 A1 * 3/2004 Schill ..... H04H 20/26 455/130
2004/0049781 A1 3/2004 Flesch et al.
2004/0071200 A1 4/2004 Betz et al.
2004/0218699 A1 * 11/2004 Carsello ..... H04L 7/042 375/343
2004/0235442 A1 11/2004 Toporski
2005/0003772 A1 * 1/2005 Nemoto ..... H04B 1/406 455/130
2006/0019601 A1 * 1/2006 Kroeger ..... H04H 20/30 455/3.06
2006/0083380 A1 * 4/2006 Mino ..... H04H 40/18 381/2
2006/0227814 A1 * 10/2006 Iannuzzelli ..... H04H 20/30 370/516
2007/0195867 A1 8/2007 Betz et al.
2007/0280098 A1 12/2007 Bhatt et al.
2007/0293167 A1 * 12/2007 Shridhar ..... H04H 40/18 455/130
2008/0015853 A1 1/2008 Honda
2008/0019609 A1 1/2008 Hamilton et al.
2008/0299926 A1 * 12/2008 Becker ..... H03J 1/0083 455/179.1
2009/0167388 A1 7/2009 Lee
2010/0027719 A1 2/2010 Pahuja
2010/0127747 A1 5/2010 Choi et al.
2010/0254498 A1 * 10/2010 Park ..... H04H 20/30 375/349
2011/0074479 A1 3/2011 Yun et al.
2011/0187567 A1 8/2011 Yeh et al.
2011/0188609 A1 * 8/2011 Minato ..... H04B 1/082 375/316
2012/0108191 A1 * 5/2012 Henson ..... H04W 52/0229 455/160.1
2013/0003637 A1 1/2013 Elenes et al.
2013/0003801 A1 * 1/2013 Elenes ..... H04H 40/18 375/224
2013/0003894 A1 1/2013 Elenes et al.
2013/0077805 A1 3/2013 Kirsch
2013/0109296 A1 * 5/2013 Dillon ..... H04H 20/28 455/3.06
2013/0115903 A1 * 5/2013 Kroeger ..... H04B 7/0845 455/193.1
2013/0279700 A1 10/2013 Whitecar et al.
2013/0303097 A1 * 11/2013 Sasho ..... H04B 1/26 455/188.1
2013/0303098 A1 * 11/2013 Carlsson ..... H04B 17/336 455/226.1
2013/0343576 A1 * 12/2013 Pahuja ..... H04H 40/36 381/119
2014/0036765 A1 * 2/2014 Fujimura ..... H04B 7/18515 370/317
2014/0098981 A1 * 4/2014 Lunner ..... H04R 25/50 381/320
2014/0193097 A1 * 7/2014 Park ..... G06T 5/50 382/284
2014/0342682 A1 * 11/2014 Kroeger ..... H04B 7/0845 455/193.1
2014/0355726 A1 * 12/2014 Elenes ..... H04L 25/03834 375/343
2015/0244555 A1 * 8/2015 Castelain ..... H04L 27/2607 375/343
2016/0182192 A1 6/2016 Milbar et al.
2016/0210084 A1 7/2016 Butler et al.
2016/0241350 A1 8/2016 Nekhamkin et al.
2016/0302093 A1 * 10/2016 Fuller ..... H04H 60/29
2016/0363619 A1 12/2016 Chou et al.
2017/0041129 A1 * 2/2017 Nekhamkin ..... H04B 1/16
2017/0169832 A1 * 6/2017 Olochwoszcz ..... G10L 19/167
2017/0302432 A1 10/2017 Kroeger et al.
2018/0139035 A1 5/2018 Kroeger et al.
2019/0190691 A1 6/2019 Kroeger et al.
2020/0287703 A1 9/2020 Kroeger et al.

OTHER PUBLICATIONS

"U.S. Appl. No. 16/880,070, Final Office Action dated Feb. 26, 2021", 13 pgs.
"U.S. Appl. No. 16/880,070, Non Final Office Action dated Oct. 2, 2020", 12 pgs.
"U.S. Appl. No. 16/880,070, Notice of Allowance dated May 5, 2021", 10 pgs.
"U.S. Appl. No. 16/880,070, Response filed Jan. 4, 2021 to Non Final Office Action dated Oct. 2, 2020", 10 pgs.
"U.S. Appl. No. 16/880,070, Response filed Apr. 19, 2021 to Final Office Action dated Feb. 26, 2021", 9 pgs.
U.S. Appl. No. 15/009,233, filed Apr. 14, 2016, Time-Alignment Measurement for Hybrid HD Radio™ Technology, U.S. Pat. No. 9,832,007.
U.S. Appl. No. 15/822,411, filed Nov. 27, 2017, Time-Alignment Measurement for Hybrid HD Radio Technology, U.S. Pat. No. 10,225,070.
U.S. Appl. No. 16/284,586, filed Feb. 25, 2019, Time-Alignment Measurement for Hybrid HD Radio Technology, U.S. Pat. No. 10,666,416.
U.S. Appl. No. 16/880,070, filed May 21, 2020, Time-Alignment Measurement for Hybrid HD Radio Technology.
"U.S. Appl. No. 15/099,233, Non Final Office Action dated Dec. 16, 2016", 18 pgs.
"U.S. Appl. No. 15/099,233, Notice of Allowance dated Jul. 28, 2017", 13 pgs.
"U.S. Appl. No. 15/099,233, Response filed Apr. 17, 2017 to Non Final Office Action dated Dec. 16, 2016", 10 pgs.
"U.S. Appl. No. 15/822,411, Final Office Action dated Aug. 15, 2018", 16 pgs.
"U.S. Appl. No. 15/822,411, Non Final Office Action dated Feb. 26, 2018", 22 pgs.
"U.S. Appl. No. 15/822,411, Notice of Allowance dated Oct. 12, 2018", 10 pgs.
"U.S. Appl. No. 15/822,411, Response filed May 11, 2018 to Non Final Office Action dated Feb. 26, 2018", 13 pgs.
"U.S. Appl. No. 15/822,411, Response filed Sep. 20, 2018 to Final Office Action dated Aug. 15, 2018", 9 pgs.

(56) References Cited

OTHER PUBLICATIONS

"U.S. Appl. No. 16/284,586, Non Final Office Action dated Aug. 8, 2019", 15 pgs.
"In-Band/On-Channel Digital Radio Broadcasting Standard", NRSC-5-C, National Radio Systems Committee, Washington, DC., (Sep. 2011), 6 pgs.
"U.S. Appl. No. 16/880,070, Notice of Allowability dated May 13, 2021", 7 pgs.
"U.S. Appl. No. 16/880,070, Notice of Allowance dated Jul. 30, 2021", 10 pgs.
"Korean Application Serial No. 10-2018-7032885, Office Action dated Nov. 3, 2021", with machine translation, 12 pgs.

* cited by examiner

TIME-ALIGNMENT MEASUREMENT FOR HYBRID HD RADIO™ TECHNOLOGY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The described methods and apparatus relate to the time alignment of analog and digital pathways in hybrid digital radio systems.

BACKGROUND OF THE INVENTION

Digital radio broadcasting technology delivers digital audio and data services to mobile, portable, and fixed receivers. One type of digital radio broadcasting, referred to as In-Band On-Channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

Both AM and FM In-Band On-Channel (IBOC) hybrid broadcasting systems utilize a composite signal including an analog modulated carrier and a plurality of digitally modulated subcarriers. Program content (e.g., audio) can be redundantly transmitted on the analog modulated carrier and the digitally modulated subcarriers. The analog audio is delayed at the transmitter by a diversity delay. Using the hybrid mode, broadcasters may continue to transmit analog AM and FM simultaneously with higher-quality and more robust digital signals, allowing themselves and their listeners to convert from analog-to-digital radio while maintaining their current frequency allocations.

The digital signal is delayed in the receiver with respect to its analog counterpart such that time diversity can be used to mitigate the effects of short signal outages and provide an instant analog audio signal for fast tuning. Hybrid-compatible digital radios incorporate a feature called "blend" which attempts to smoothly transition between outputting analog audio and digital audio after initial tuning, or whenever the digital audio quality crosses appropriate thresholds.

In the absence of the digital audio signal (for example, when the channel is initially tuned) the analog AM or FM backup audio signal is fed to the audio output. When the digital audio signal becomes available, the blend function smoothly attenuates and eventually replaces the analog backup signal with the digital audio signal while blending in the digital audio signal such that the transition preserves some continuity of the audio program. Similar blending occurs during channel outages which corrupt the digital signal. In this case the analog signal is gradually blended into the output audio signal by attenuating the digital signal such that the audio is fully blended to analog when the digital corruption appears at the audio output.

Blending will typically occur at the edge of digital coverage and at other locations within the coverage contour where the digital waveform has been corrupted. When a short outage does occur, as when traveling under a bridge in marginal signal conditions, the digital audio is replaced by an analog signal.

When blending occurs, it is important that the content on the analog audio and digital audio channels is time-aligned to ensure that the transition is barely noticed by the listener. The listener should detect little other than possible inherent quality differences in analog and digital audio at these blend points. If the broadcast station does not have the analog and digital audio signals aligned, then the result could be a harsh-sounding transition between digital and analog audio. This misalignment or "offset" may occur because of audio processing differences between the analog audio and digital audio paths at the broadcast facility.

The analog and digital signals are typically generated with two separate signal-generation paths before combining for output. The use of different audio-processing techniques and different signal-generation methods makes the alignment of these two signals nontrivial. The blending should be smooth and continuous, which can happen only if the analog and digital audio are properly aligned.

The effectiveness of any digital/analog audio alignment technique can be quantified using two key performance metrics: measurement time and offset measurement error. Although measurement of the time required to estimate a valid offset can be straightforward, the actual misalignment between analog and digital audio sources is often neither known nor fixed. This is because audio processing typically causes different group delays within the constituent frequency bands of the source material. This group delay can change with time, as audio content variation accentuates one band over another. When the audio processing applied at the transmitter to the analog and digital sources is not the same—as is often the case at actual radio stations—audio segments in corresponding frequency bands have different group delays. As audio content changes over time, misalignment becomes dynamic. This makes it difficult to ascertain whether a particular time-alignment algorithm provides an accurate result.

Existing time alignment algorithms rely on locating a normalized cross-correlation peak generated from the analog and digital audio sample vectors. When the analog and digital audio processing is the same, a clearly visible correlation peak usually results.

However, techniques that rely solely on normalized cross-correlation of digital and analog audio vectors often produce erroneous results due to the group-delay difference described above. When the analog and digital audio processing is different, the normalized cross correlation is often relatively low and lacks a definitive peak.

Although multiple measurements averaged over time can reduce the dynamic offset measurement error, this leads to excessive measurement times and potential residual offset error due to persistent group-delay differences. Since an HD Radio receiver may use this measurement to improve real-time hybrid audio blending, excessive measurement time and offset error make this a less attractive solution. Therefore, improved techniques for measuring time offsets are desired.

SUMMARY

In a first aspect, a method for processing a digital audio broadcast signal in a radio receiver, includes: receiving a hybrid broadcast signal; demodulating the hybrid broadcast signal to produce an analog audio stream and a digital audio stream; and using a normalized cross-correlation of envelopes of the analog audio stream and the digital audio stream to measure a time offset between the analog audio stream and the digital audio stream.

In another aspect, a radio receiver includes processing circuitry configured to receive a hybrid broadcast signal; to demodulate the hybrid broadcast signal to produce an analog audio stream and a digital audio stream; and to use a normalized cross-correlation of envelopes of the analog audio stream and the digital audio stream to measure a time offset between the analog audio stream and the digital audio stream.

In another aspect, a method for aligning analog and digital signals includes: receiving or generating an analog audio stream and a digital audio stream; using a normalized cross-correlation of envelopes of the analog audio stream and the digital audio stream to measure a time offset between the analog audio stream and the digital audio stream; and using the time offset to align the analog audio stream and the digital audio stream.

DETAILED DESCRIPTION

Embodiments described herein relate to the processing of the digital and analog portions of a digital radio broadcast signal. This description includes an algorithm for time alignment of analog and digital audio streams for an HD Radio receiver or transmitter. While aspects of the disclosure are presented in the context of an exemplary HD Radio system, it should be understood that the described methods and apparatus are not limited to HD Radio systems and that the teachings herein are applicable to methods and apparatus that include the measurement of time offset between two signals.

Figure 1:
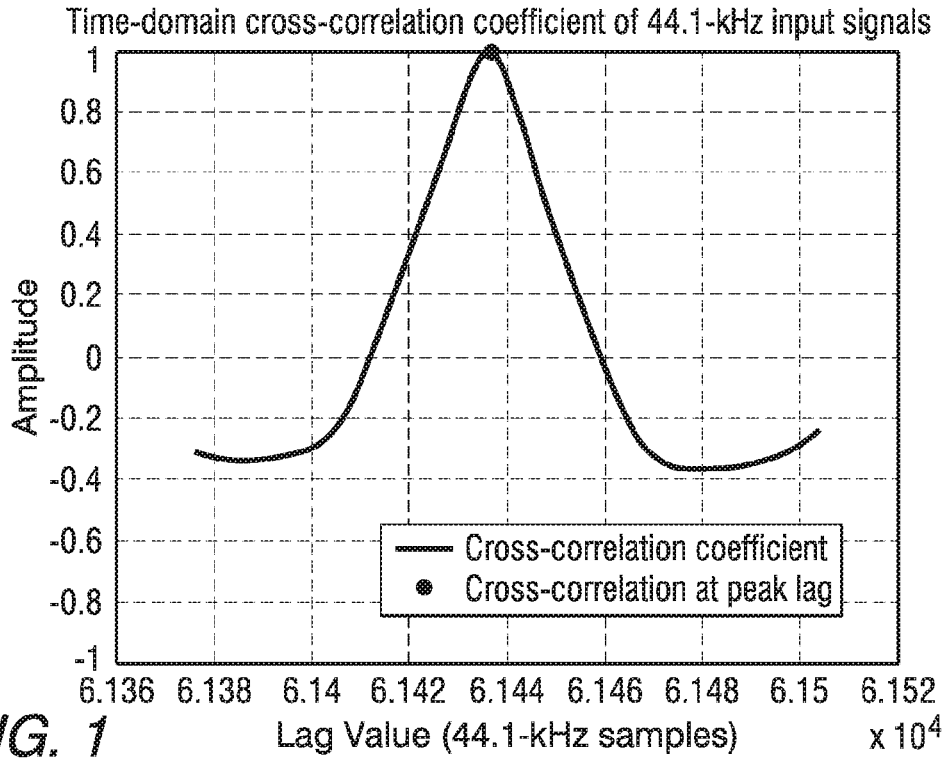
FIG. 1 is a graph of a typical normalized cross-correlation peak with identical analog/digital audio processing.

Previously known algorithms for time alignment of analog and digital audio streams rely on locating a normalized cross-correlation peak generated from the analog and digital audio sample vectors. When the analog and digital audio processing is the same, a clearly visible correlation peak usually results. For example, FIG. 1 is a graph of a typical normalized cross-correlation peak with identical analog/digital audio processing.

However, audio processing typically causes different group delays within the constituent frequency bands of the source material. This group delay can change with time, as audio content variation accentuates one frequency band over another. When the audio processing applied at the transmitter to the analog and digital sources is not the same—as is often the case at actual radio stations—audio segments in corresponding frequency bands have different group delays. As audio content changes over time, misalignment becomes dynamic. This makes it difficult to ascertain whether a particular time-alignment algorithm provides an accurate result.

Figure 2:
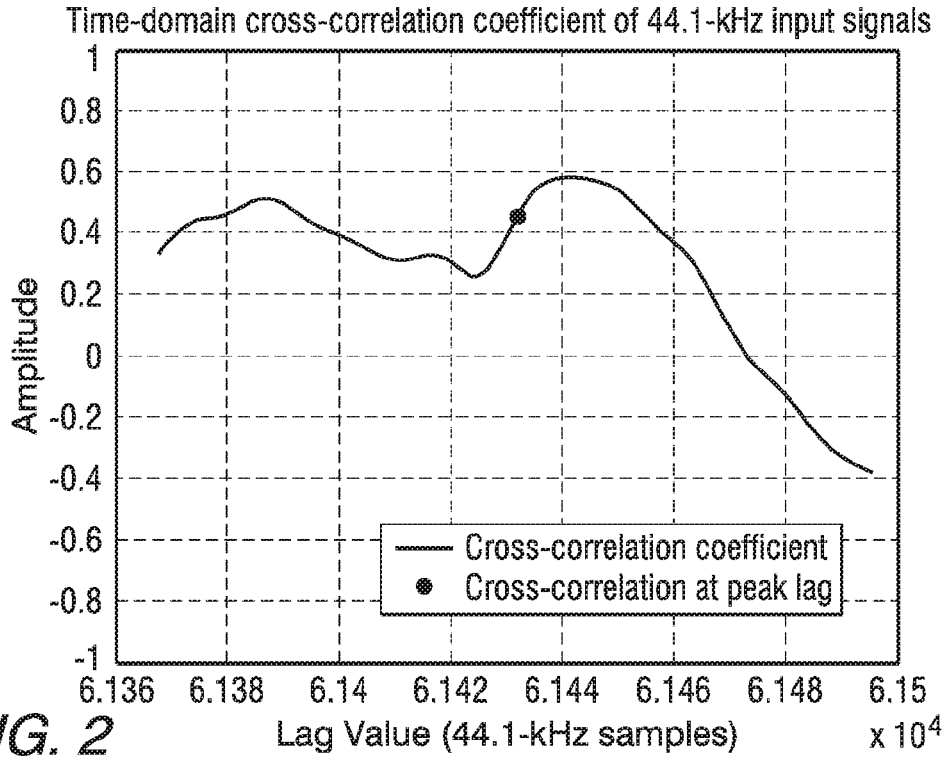
FIG. 2 is a graph of a typical normalized cross-correlation with different analog/digital audio processing.

As a result of this group delay, when the analog and digital audio processing is different, the normalized cross correlation is often relatively low and lacks a definitive peak. FIG. 2 is a graph of a typical normalized cross-correlation with different analog/digital audio processing. Therefore, techniques that rely solely on normalized cross-correlation of digital and analog audio vectors often produce erroneous results.

Figure 3:
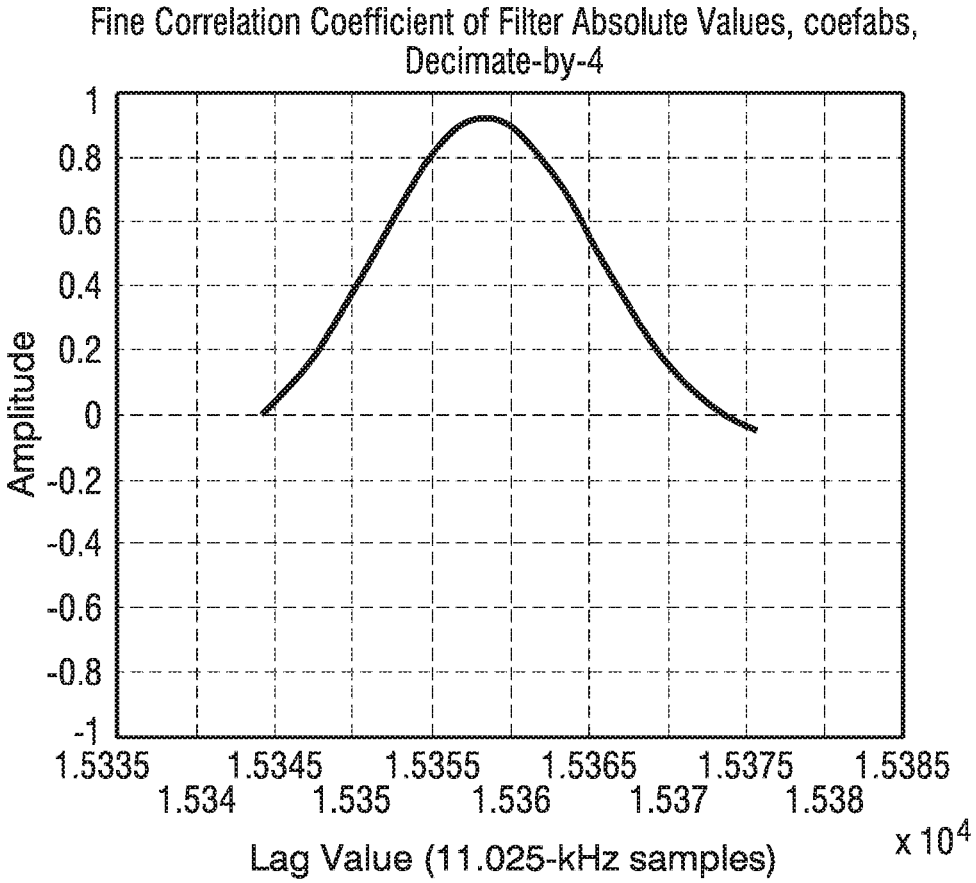
FIG. 3 is a graph of a typical normalized cross-correlation of audio envelopes with different analog/digital audio processing.

Correlation of audio envelopes (with phase differences removed) can be used to reduce or eliminate the problems due to group delay differences. The techniques described herein utilize the correlation of audio envelopes to solve the problem of offset measurement error caused by group-delay variations between the digital and analog audio streams. FIG. 3 is a graph of a typical normalized cross-correlation of audio envelopes with different analog/digital audio processing.

The techniques described herein are efficient and require significantly less measurement time than previously known techniques because the need for consistency checks is reduced. Additionally, a technique for correcting group-delay differences during the blend ramp is described.

Time alignment between the analog audio and digital audio of a hybrid HD Radio waveform is needed to assure a smooth blend from digital to analog in the HD Radio receivers. Time misalignment sometimes occurs at the transmitter, although alignment should be maintained. Misalignment can also occur at the receiver due to implementation choices when creating the analog and digital audio streams. A time-offset measurement can be used to correct the misalignment when it is detected. It can also be used to adjust blending thresholds to inhibit blending when misalignment is detected and to improve sound quality during audio blends.

The described technique is validated by measuring the normalized cross correlation of the analog and digital audio vectors after correcting any group delay differences between them. This results in a more accurate, efficient, and rapid time offset measurement than previous techniques.

In the described embodiment, multistage filtering and decimation are applied to isolate critical frequency bands and improve processing efficiencies. Normalized cross-correlation of both the coarse and fine envelopes of the analog and digital audio streams is used to measure the time offset. As used in this description, a coarse envelope represents the absolute value of an input audio signal after filtering and decimation by a factor of 128, and a fine envelope represents the absolute value of an input audio signal after filtering and decimation by a factor of 4. Correlation is performed in two steps—coarse and fine—to improve processing efficiency.

Figure 4:
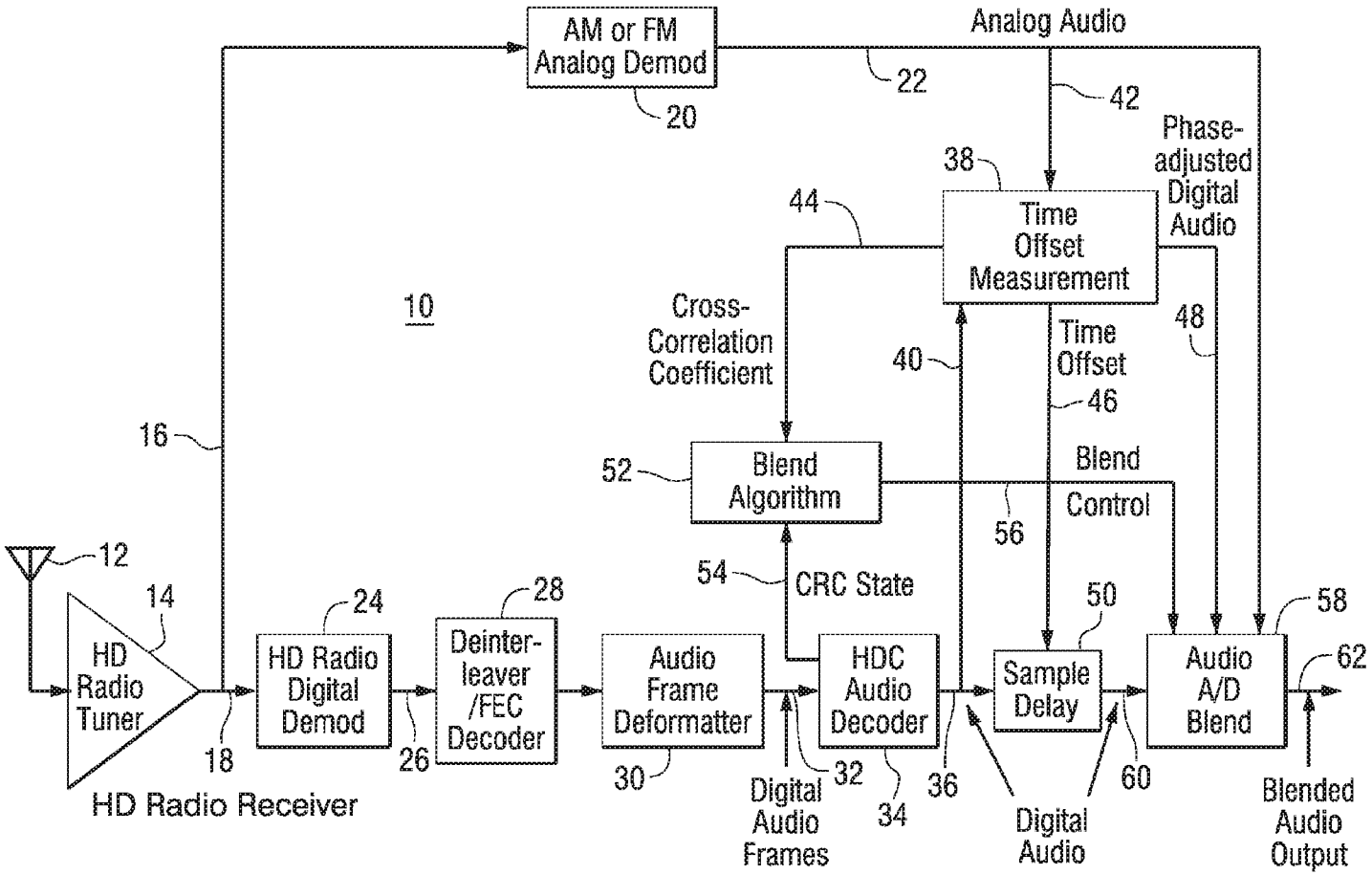
FIG. 4 is a high-level functional block diagram of an HD Radio receiver highlighting the time-alignment algorithm.

A high-level functional block diagram of an HD Radio receiver 10 highlighting the time-alignment algorithm is shown in FIG. 4. An antenna 12 receives a hybrid HD Radio signal that is input to an HD Radio tuner 14. The tuner output includes an analog modulated signal on line 16 and a digitally modulated signal on line 18. Depending upon the input signal, the analog modulated signal could be amplitude modulated (AM) or frequency modulated (FM). The AM or FM analog demodulator 20 produces a stream of audio samples, referred to as the analog audio stream on line 22. The HD Radio digital demodulator 24 produces a stream of digital symbols on line 26. The digital symbols on line 26 are deinterleaved and decoded in a deinterleaver/FEC decoder 28 and deformatted in an audio frame deformatter 30 to produce digital audio frames on line 32. The digital audio frames are decoded in an HD Radio audio decoder 34 to produce a digital audio signal on line 36. A time offset measurement function 38 receives the digital audio signal on line 40 and the analog audio signal on line 42 and produces three outputs: a cross-correlation coefficient on line 44; a time offset signal on line 46, and a phase adjusted digital audio signal on line 48. The time offset signal controls the sample delay of the digital audio signal as shown in block 50.

Cyclic redundancy check (CRC) bits of the digital audio frames are checked to determine a CRC state. CRC state is determined for each audio frame (AF). For example, the CRC state value could be set to 1 if the CRC checks, and set to 0 otherwise. A blend control function 52 receives a CRC state signal on line 54 and the cross-correlation coefficient on line 44, and produces a blend control signal on line 56.

An audio analog-to-digital (A/D) blend function 58 receives the digital audio on line 60, the analog audio on line 22, the phase-adjusted digital audio on line 48, and the blend control signal on line 56, and produces a blended audio output on line 62. The analog audio signal on line 42 and the digital audio signal on line 40 constitute a pair of audio signal vectors.

In the receiver depicted in FIG. 4, a pair of audio-signal vectors is captured for time alignment. One vector is for the analog audio signal (derived from the analog AM or FM demodulator) while the other vector is for the digital signal (digitally decoded audio). Since the analog audio signal is generally not delayed more than necessary for demodulation and filtering processes, it will be used as the reference time signal. The digital audio stream should be time-aligned to the analog audio stream for blending purposes. An intentional diversity delay between the two audio streams allows for time adjustment of the digital audio stream relative to the analog audio stream.

The time offset measurement block 38 in FIG. 4 provides three algorithm outputs, which correspond to three possible embodiments, wherein:

(1) A cross-correlation coefficient may be passed to the blend algorithm to adjust blend thresholds and inhibit blending when misalignment is detected;

(2) The delay of the digital audio signal may be adjusted in real time using the measured time offset, thereby automatically aligning the analog and digital audio; or (3) Phase-adjusted digital audio may temporarily replace the input digital audio to improve sound quality during blends.

In another embodiment, a filtered time-offset measurement could also be used for automatic time alignment of the analog and digital audio signals in HD Radio hybrid transmitters.

Details of the time-offset measurement technique are described next.

In this embodiment, monophonic versions of the analog and digital audio streams are used to measure time offset. This measurement is performed in multiple steps to enhance efficiency. It is assumed here that the analog and digital audio streams are sampled simultaneously and input into the measurement device. The appropriate metric for estimating time offset for the analog and digital audio signals is the correlation coefficient function implemented as a normalized cross-correlation function. The correlation coefficient function has the property that it approaches unity when the two signals are time-aligned and identical, except for possibly an arbitrary scale-factor difference. The coefficient generally becomes statistically smaller as the time offset increases. The correlation coefficient is also computed for the envelope of the time-domain signals due to its tolerance to group-delay differences between the analog and digital signals.

Exemplary pseudocode for the executive function that controls the time-offset measurements, MEAS_TIME_ALIGNMENT, is shown below.

```
MEAS_TIME_ALIGNMENT
M = 2^13; "length of analog audio vector at 44.1 ksps"
N = 2^17; "length of digital audio vector (implementation dependent)"
results = 0; resultsprev = 0; resultsprev2 = 0; "Clear output vectors"
for k = 0...K − 1 ; "K is the number of measurement vectors"
    get vector x ;"vector of M analog audio samples"
    get vector y ;"vector of N digital audio samples"
    [xenv,yenv,xabsf , yabsf ,xbass,ybass] = filter_vectors(x, y)
    lagmin = 0
    lagmax = length(yenv)−length(xenv);   "Set coarse lag range"
    [peakabs,offset,corr_coef,corr_phadj,ynormadj,peakbass] =
        meas_offset(x,y,xenv,yenv,xabsf,yabsf,xbass,ybass,lagmin,lagmax)
    "output arguments are set to zero if not measured due to RETURN or invalid"
    resultsprev2 = resultsprev;   "save results from two iterations ago"
    resultsprev = results;   "save results from previous iteration"
    results = [peakabs,offset,corr_coef,corr_phadj,ynormadj,peakbass]
    "Analyze results to determine if time offset measurement is successful"
    if (corr_phadj > 0.8)^
        { (peakabs > 0.8)^
          [(|offset − offset_prev| ≤ 2)^(peakabs + peakabs_prev > 1)]^
          [(|offset − offset_prev2| 23 2)^(peakabs + peakabs_prev2 > 1)] }
            break;   "PASS:return results"
    end if
    "Continue with next measurement vector if results are not validated"
end for
```

A vector y of N digital audio samples is first formed for the measurement. Another smaller M-sample vector x of analog audio samples is used as a reference analog audio vector.

The goal is to find a vector subset of y that is time-aligned with x. Ideally, the signals are nominally time-aligned with the center of they vector. This allows the time-offset measurement to be computed over a range of ±(N−M)/2 samples relative to the midpoint of they vector. A recommended value of N is $2^{17}$=131072 audio samples spanning nearly three seconds at a sample rate of 44.1 ksps. The search range is about ±1.4 seconds for $M=2^{13}$=8192 (approximately 186 msec).

The analog and digital audio input vectors are then passed through a filter_vectors function to isolate the desired audio frequency bands and limit processor throughput requirements. The audio spectrum is separated into several distinct passbands for subsequent processing. These bands include the full audio passband, bass frequencies, and bandpass frequencies. The bandpass frequencies are used create the audio envelopes that are required for accurate cross-correlation with phase differences removed. Bass frequencies are removed from the bandpass signals since they may introduce large group-delay errors when analog/digital audio processing is different; however, the isolated bass frequencies may be useful to validate the polarity of the audio signals. Furthermore, high frequencies are removed from the bandpass signal because time-alignment information is concentrated in lower non-bass frequencies. The entire audio passband is used to predict potential blend sound quality and validate envelope correlations.

After filtering, the range of coarse lag values is set and function meas_offset is called to perform the time-offset measurement. The coarse lag values define the range of sample offsets over which the smaller analog audio envelope is correlated against the larger digital audio envelope. This range is set to the difference in length between the analog and digital audio envelopes. After the coarse envelope correlation is complete, a fine envelope correlation is performed at a higher sample rate over a narrower range of lag values.

The results are then analyzed to determine whether the correlation peaks and offset values are valid. Validity is determined by ensuring that key correlation peaks exceed a threshold, and that these peak correlation values and their corresponding offset values are temporally consistent.

If not, the process repeats using new input measurement vectors until a valid time offset is declared. Once a valid time offset has been computed, the algorithm can be run periodically to ensure that proper time-alignment is being maintained.

The executive pseudocode MEAS_TIME_ALIGNMENT calls subsequent functions.

Figure 5:
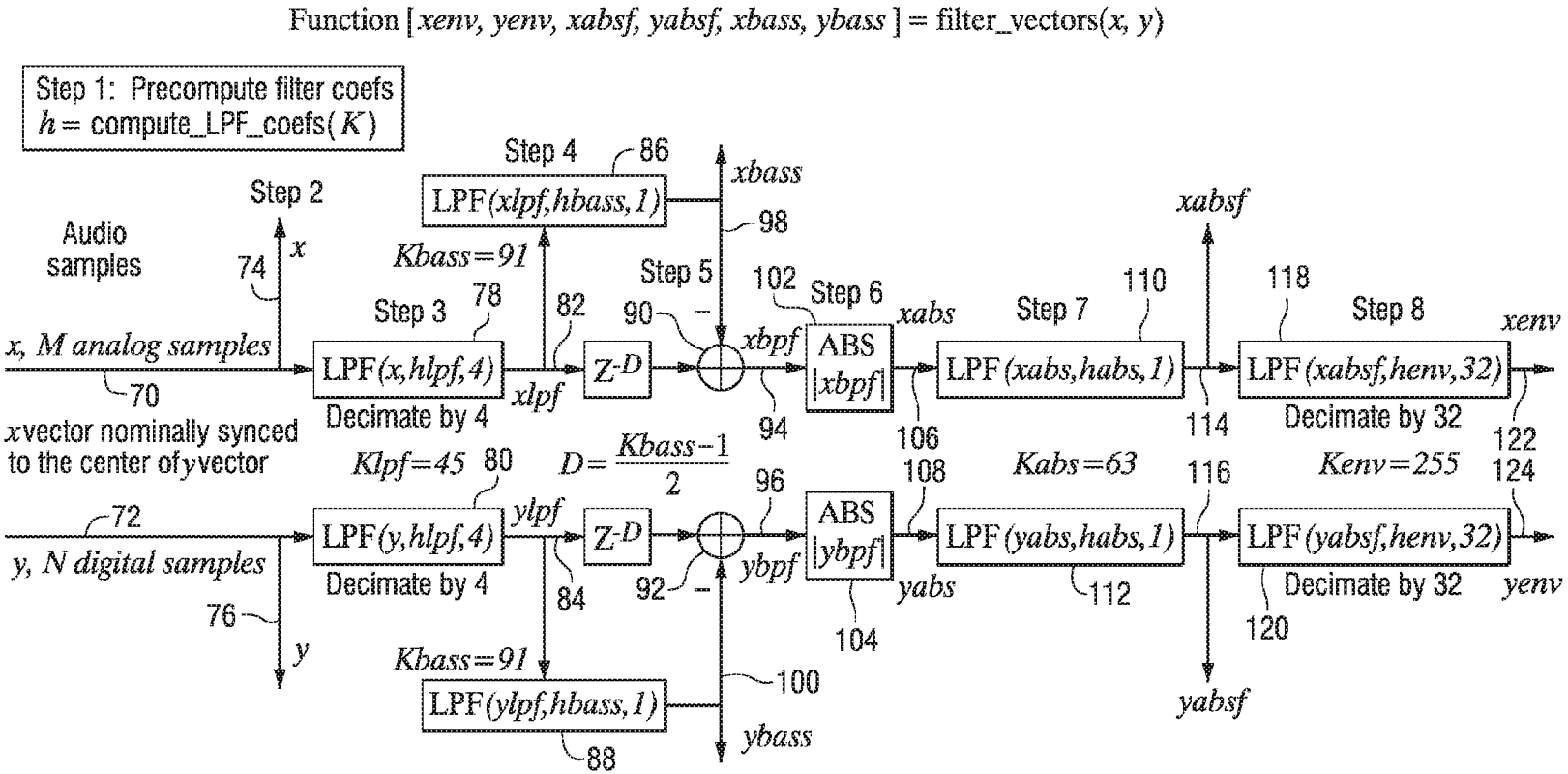
FIG. 5 is a signal flow diagram of an exemplary filtering and decimation function.
Figure 12:
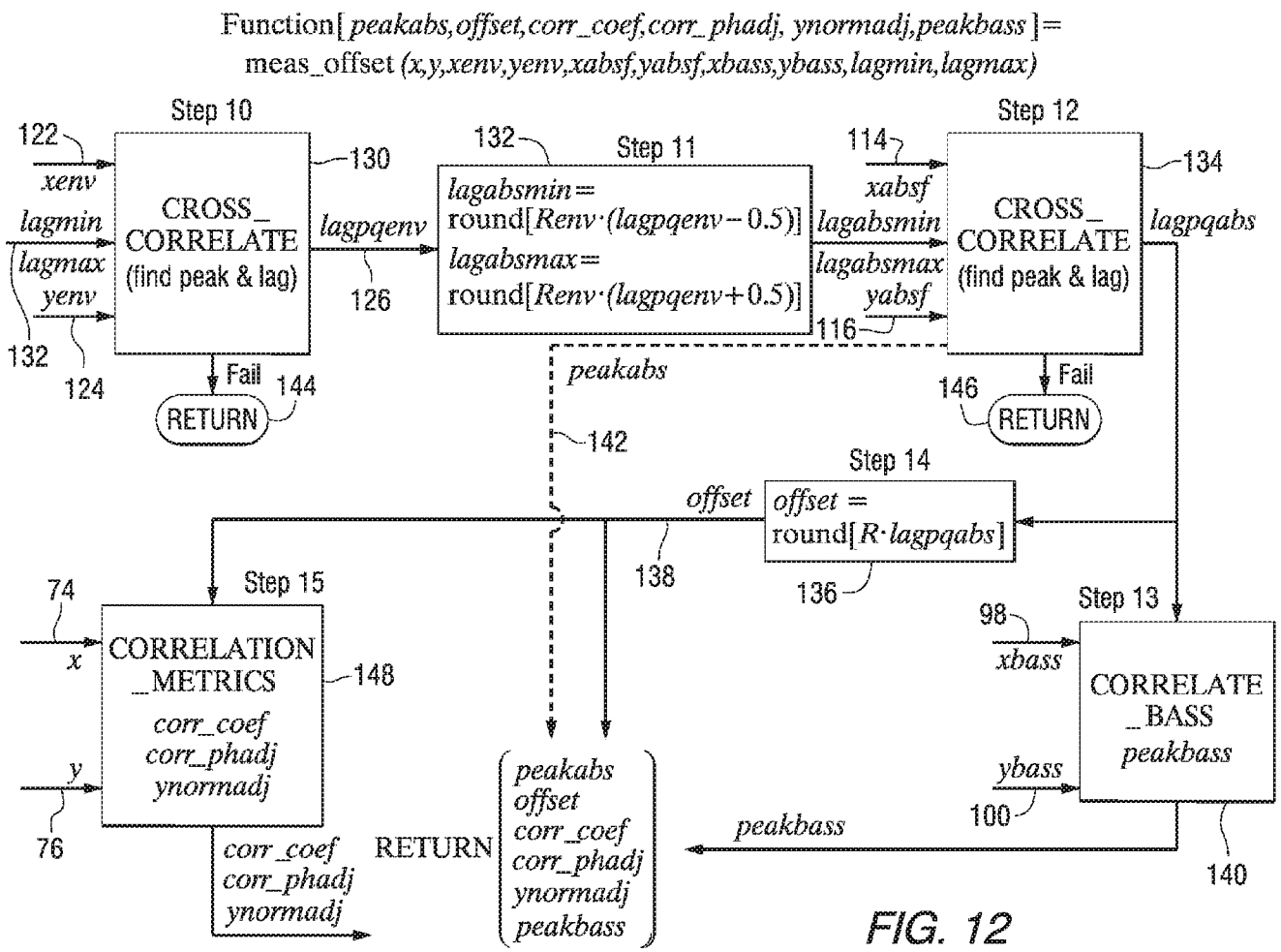
FIG. 12 is a functional block diagram of an exemplary time-alignment algorithm.

The time-offset measurements as a hierarchical series of functions are described below. These functions are described either as signal-flow diagrams or pseudocode, whichever is more appropriate for the function. FIGS. 5 and 12 are annotated with step numbers for cross-referencing with step-by-step implementation details provided below.

FIG. 5 is a signal flow diagram of the first function filter_vectors called by MEAS_TIME_ALIGNMENT.

The input audio vectors x and y on lines 70 and 72 are initially processed in multiple stages of filtering and decimation, as shown in FIG. 5. The x and y sample streams are available for further processing on lines 74 and 76. Multistage processing is efficient and facilitates several types of measurements. The x and y vectors are first lowpass filtered by filters 78 and 80 to prevent subsequent cross-correlation of higher frequencies that could be affected by slight time offsets, and to improve computational efficiency. This produces xlpf and ylpf signals on lines 82 and 84, respectively. Even lower bass frequencies are removed from the xlpf and ylpf signals using filters 86 and 88 and combiners 90 and 92 to create bandpass signals xbpf and ybpf on line 94 and 96. This eliminates large group-delay variations caused by different bass processing on the analog and digital versions of the audio, which could also affect the envelope in subsequent processing. The xbass and ybass signals are available for further processing on lines 98 and 100.

The bandpass filter stages are followed by an absolute-value function 102 and 104 to allow envelope correlation. The resulting xabs and yabs signals on lines 106 and 108 are then filtered by filters 110 and 112 to produce xabsf and yabsf on lines 114 and 116, which are used to determine the fine cross-correlation peak. These signals are further filtered and decimated in filters 118 and 120 to yield the coarse envelope signals xenv and yenv on lines 122 and 124. The coarse envelope cross-correlation is used to locate the vicinity of the correlation time offset, allowing subsequent fine correlation of xabsf and yabsf to be efficiently computed over a narrower range of lag values.

Figure 6:
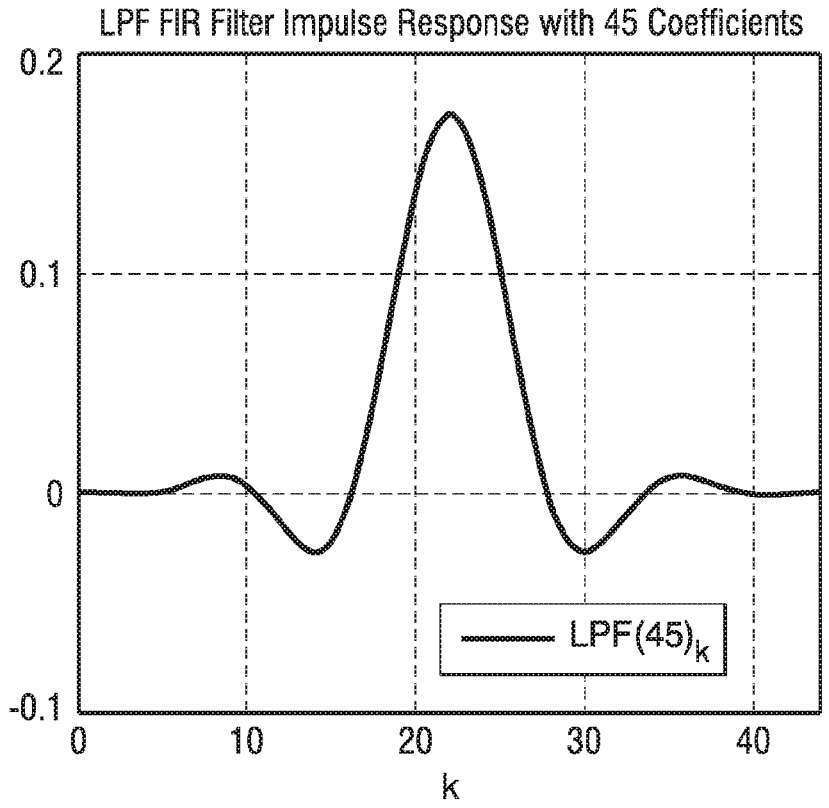
FIG. 6 is a graph of a filter impulse response.

FIG. 6 is a graph of a LPF FIR filter impulse response. Each of the lowpass filters (LPFs) in FIG. 5 has a similar impulse response based on a cosine-squared windowed sinc function, as illustrated in FIG. 6. All filters have the same shape spread over the number of selected coefficients, K, where K=45 in this example.

The signals are scaled in time by the number of filter coefficients K, which inversely scales frequency span. The filter coefficients for each predetermined length K can be pre-computed for efficiency using function compute_LPF_coefs, defined below.

Exemplary pseudocode for the function compute_LPF_coefs for generating filter coefficients follows.

---

Function[h] = compute_LPF_coefs(K)
"Compute K LPF FIR filter coefficients, K is odd, k = to K − 1"

$$h_{\frac{K-1}{2}} = \frac{4\cdot\pi}{K+1};$$ "center coefficient to avoid divide - by - zero"

for $k = 1 \ldots \frac{K-1}{2}$ $$h_{k+\frac{K-1}{2}} = \frac{\cos\left(\frac{\pi\cdot k}{K+1}\right)^2\cdot\sin\left(\frac{8\cdot\pi\cdot k}{K+1}\right)}{2\cdot k};$$ "upper half coefficients"

$$h_{\frac{K-1}{2}-k} = h_{k+\frac{K-1}{2}};$$ "copy to lower half coefficients"

end for $$h = \frac{h}{\sum_{k=0}^{K-1} h_k};$$ "normalize filter coefficient vector for unity dc gain"

---

The filter inputs include the input vector u, filter coefficients h, and the output decimation rate R.

Exemplary pseudocode for the LPF function is:

---

Function[v] = LPF(u, h, R)
"u is the input signal vector, h is the filter coefficient vector, R is decimation rate"
K = length(h); "Number of filter coefficients"

$$N = \text{ceil}\left(\frac{\text{length}(u) - K + 1}{R}\right);$$ "N is the length of the filter output vector v"

$$v_n = \sum_{k=0}^{K-1} h_k\cdot u_{n\cdot R+k};\ \text{for } n = 0 \ldots N-1$$

---

Filter passbands for the various signals of FIG. 5 in an exemplary embodiment are shown in FIGS. 7-11.

Figure 7:
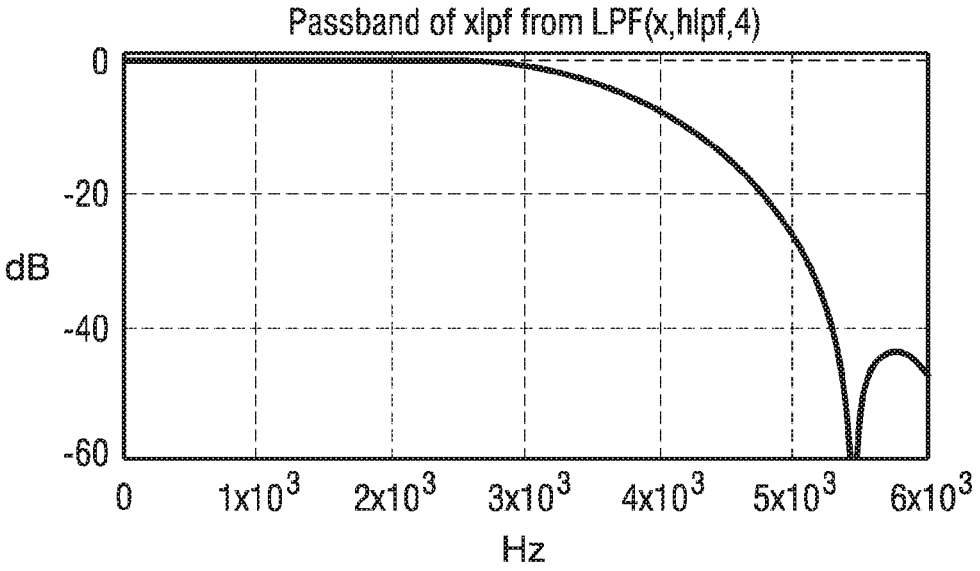
FIGS. 7 through 11 are graphs that illustrate filter passbands.
Figure 8:
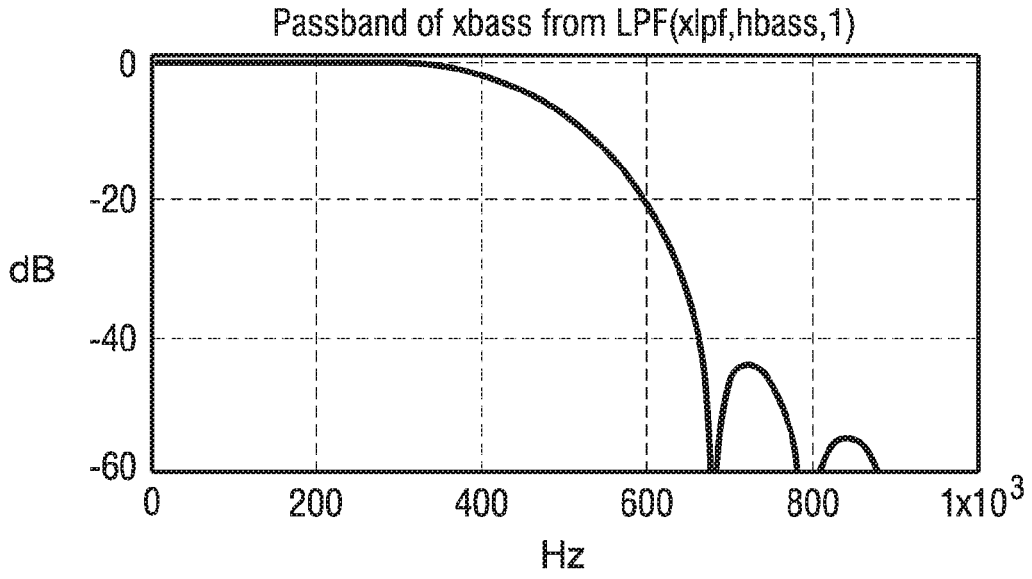
Figure 9:
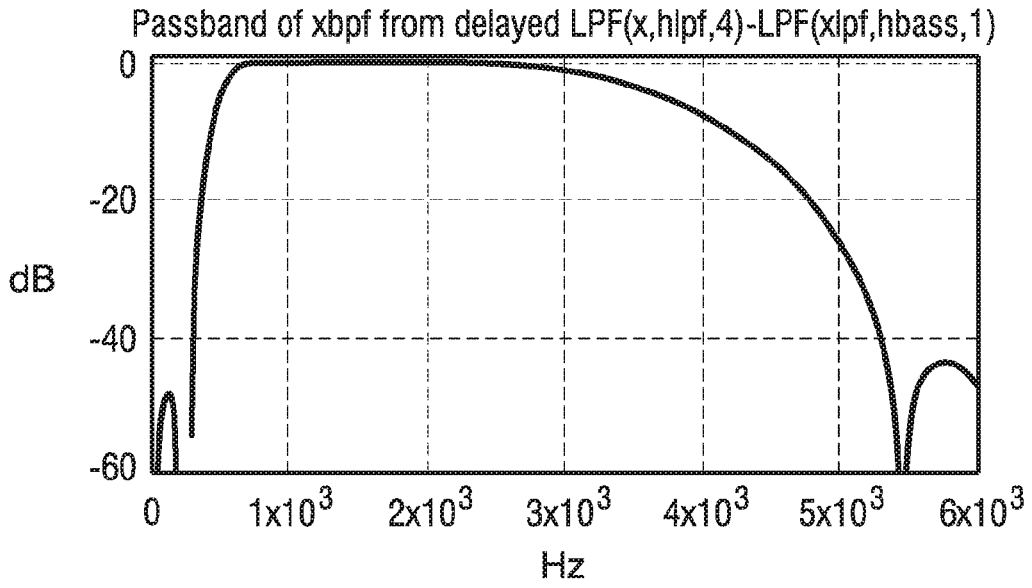
Figure 10:
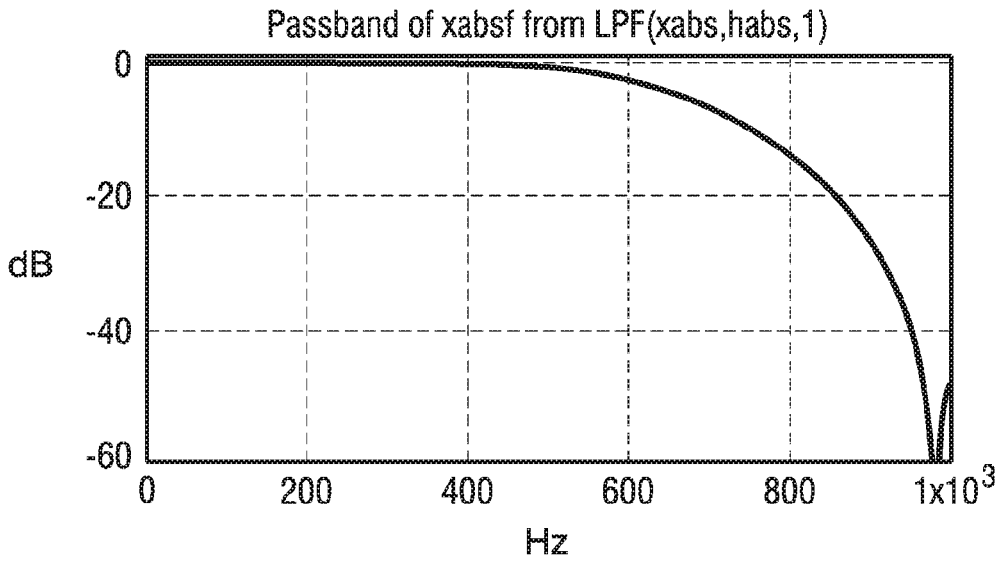
Figure 11:
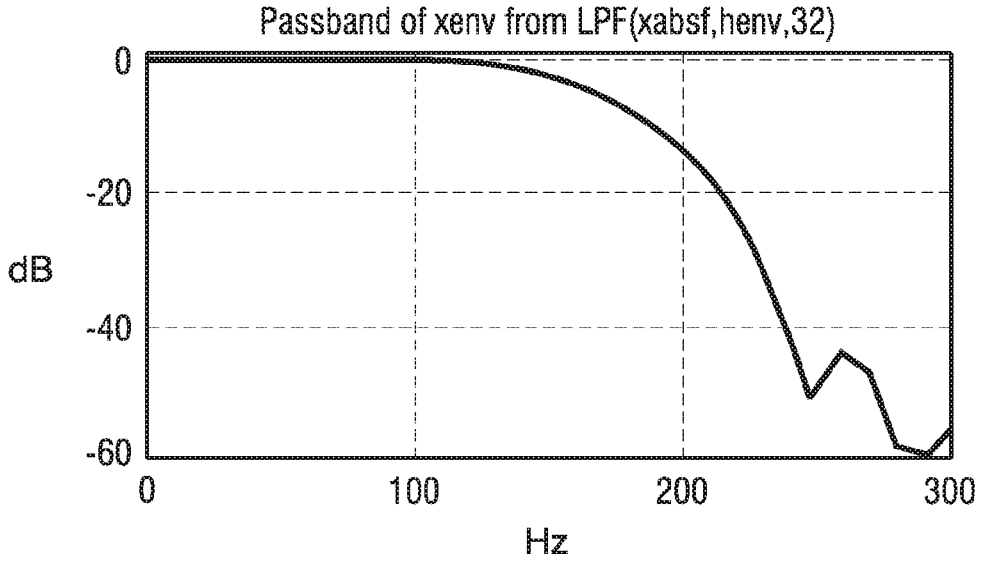

FIG. 7 shows the passband of xlpf from LPF(x, hlpf, 4). FIG. 8 shows the passband of xbass from LPF(xlpf, hbass, 1). FIG. 9 shows the passband of xbpf from appropriately delayed LPF(x, hlpf, 4)-LPF(xlpf, hbass, 1). FIG. 10 shows the passband of xabsf from LPF(xabs, habs, 1). FIG. 11 shows the passband of xenv from LPF(xabsf, henv, 32).

After filtering, the executive MEAS_TIME_ALIGNMENT estimates the time offset between input analog and digital audio signals by invoking function meas_offset. An embodiment of a signal-flow diagram of the second function meas_offset called by executive MEAS_TIME_ALIGNMENT is shown in FIG. 12.

As alluded to above, normalized cross-correlation should be performed on the envelopes of the audio signals to prevent group-delay differences caused by different analog/digital audio processing. For efficiency, this correlation is performed in two steps—coarse and fine—by the function CROSS_CORRELATE.

Referring to FIG. 12, the meas_offset function first calls a CROSS_CORRELATE function 130 to compute a coarse cross-correlation coefficient using the input audio envelopes xenv on line 122 and yenv on line 124 (which are decimated by a factor of 128 from the input audio signals). The range of lag values on line 132 used for this correlation is computed by the executive, and allows sliding of the smaller xenv vector through the entire length of yenv. The coarse correlation in block 130 is performed at a modest sample rate. The resulting coarse correlation peak index lagpqenv on line 126 effectively narrows the range of lag values (from lagabsmin to lagabsmax in block 132) for subsequent fine correlation in block 134 of xabsf on line 114 and yabsf on line 116. This fine correlation is also performed by function CROSS_CORRELATE at a sample rate that is 32 times higher. The index of the fine correlation peak, following conversion to an integer number of 44.1-ksps audio samples in block 136, is output as offset on line 138 (the desired time-offset measurement). The peak correlation value peakabs is determined in block 134 and returned on line 142. If the result of either the coarse or fine correlation is invalid, control is passed back to the executive and processing continues with the next measurement vector, as shown in blocks 144 and 146.

Exemplary pseudocode for the CROSS_CORRELATE function is provided below.

```
Function[peak,lagpq] = CROSS_CORRELATE(u,v,lagmin,lagmax)
"Compute the cross-correlation of the input vectors, and their componentsa & b"
[coefa,coefb,coef] = con_coef_vectors(u,v,lagmin,lagmax)
"Find the peak of the vectors"
[peaka,lagpqa] = peak_lag(coefa)
[peakb,lagpqb] = peak_lag(coefb)
[peak,lagpq] = peak_lag(coef)
"Check if the measurement peak is valid"
RETURN FAIL if (peak < 0.7)˘(|lagpq − lagpqa| > 0.5)˘(|lagpq −lagpqb| > 0.5)
```

The CROSS_CORRELATE function first calls function corr_coef_vectors to split in half each input vector and compute cross-correlation coefficients not only for the composite input vectors (coef), but also for their bifurcated components (coefa and coefb). The peak index corresponding to each of the three correlation coefficients (lagpq, lagpqa, and lagpqb) is also determined by function peak_lag. This permits correlation validation via temporal consistency. If the lags at the peaks of the bifurcated components both fall within half a sample of the composite lag (at the native sample rate), and if the composite peak value exceeds a modest threshold, the correlation is deemed valid. Otherwise, control is passed back to meas_offset and MEAS_TIME_ALIGNMENT, and processing will continue with the next measurement vector.

After the inputs to function corr_coef_vectors have been bifurcated, the mean is removed from each half to eliminate the bias introduced by the absolute value (envelope) operation in function filter_vectors. The cross-correlation coefficient also requires normalization by the signal energy (computed via auto-correlation of each input) to ensure the output value does not exceed unity. All of this processing need only be performed once for the shorter analog input vector u. However, the digital input vector v must be truncated to the length of the analog vector, and its normalization factors (Svva and Svvb) and the resulting cross-correlation coefficients are calculated for each lag value between lagmin and lagmax. To reduce processing requirements, the correlation operations are performed only for the bifurcated vectors. The composite correlation coefficient coef is obtained through appropriate combination of the bifurcated components.

Exemplary pseudocode of the first function corr_coef_vectors called by CROSS_CORRELATE is as follows. Note that all correlation operations are concisely expressed as vector dot products.

```
Function[coefa,coefb,coef] = corr_coef_vectors(u,v,lagmin,lagmax)
"cross - correlate smaller vector u over longer vector v over tag range"
"bifurcate vector u into 2 parts ua and ub each of length Ka"
```

$$Ka = \text{floor}\left\{\frac{\text{length}(u)}{2}\right\}$$

```
uam = subvector(u,0...Ka − 1); "extract first half of vector u"
ua = uam − mean(uam)
ubm = subvector(u, Ka...2 · Ka − 1); "extract second half of vector u"
ub = ubm - mean(ubm)
Suua = ua · ua ; "vector dot product, scalar result"
Suub = ub · ub ; "vector dot product, scalar result"
for lag = lagmin...lagmax; "correlation coefficients each lag"
  vam = subvector(v,lag...lag + Ka − 1)
  va = vam − mean(vam)
  vbm = subvector(v,lag + Ka...lag + 2 · Ka − 1)
  vb = vbm − mean(vbm)
  Svva = va · va
  Svvb = vb · vb
```

-continued

```
Suva = ua · va
Suvb = ub · vb
```

$$\text{coefa}_{lag} = \frac{\text{Suva}}{\sqrt{\text{Suua} \cdot \text{Svva}}}$$

-continued $$coefb_{lag} = \frac{Suvb}{\sqrt{Suub \cdot Svvb}}$$

$$coef_{lag} = \frac{Suva + Suvb}{\sqrt{(Suua + Suub)\cdot(Svva + Svvb)}}$$

end for

Exemplary pseudocode of the second function peak_lag called by CROSS_CORRELATE is as follows.

Function[peak,lagpq] = peak_lag(coef)
"Find vector peak and lag index lagpq"
L = length(coef)
peak = 0
lagp = 0
for lag = 0...L − 1
  if $coef_{lag}$ > peak
    peak = $coef_{lag}$
    lagp = lag
end for
if (lagp = 0)  (lagp = L − 1)
  peak = 0
  lagpq = 0
otherwise
  "quadratic fit peak"

$$lagpq = lagp + \frac{coef_{lagp-1} - coef_{lagp+1}}{2\cdot(coef_{lagp-1} + coef_{lagp+1}) - 4\cdot coef_{lagp}}$$

Function peak_lag is called by CROSS_CORRELATE to find the peak value and index of the input cross-correlation coefficient. Note that if the peak lies on either end of the input vector, both the outputs (peak and lagpq) will be cleared, effectively failing the cross-correlation operation. This is because it is not possible to determine whether a maximum at either end of the vector is truly a peak. Also, since this function is run at a relatively coarse sample rate (either 44100/4=11025 Hz or 44100/128=344.53125 Hz), the resolution of the peak lag value is fairly granular. This resolution is improved via quadratic interpolation of the peak index. The resulting output lagpq typically represents a fractional number of samples; it is subsequently rounded to an integer number of samples in the meas_offset function.

Function CORRELATION_METRICS in block 148 of FIG. 12 is called by meas_offset to validate the fine time-offset measurement and generate phase-adjusted digital audio for improved blend quality. In the described embodiment, all correlations are performed at the single lag offset (as opposed to a range of lag values). As in other functions, correlations are normalized and compactly expressed as dot products.

Exemplary pseudocode of the function CORRELATION_METRICS called by meas_offset is as follows.

Function[corr_coef, corr_phadj, ynormadj] = CORRELATION_METRICS(x, y, offset)
$Kt = 2^{floor\{log2[length(x)]\}}$; "truncate vector size to largest power of 2"
xpart = subvector(x, 0, Kt − t)
ypart = subvector(y, offset, offset + Kt − 1)

$$xnorm = \frac{xpart}{\sqrt{xpart \cdot xpart}};$$ "· dot product scalar result"

-continued $$ynorm = \frac{ypart}{\sqrt{ypart + ypart}};$$ "· dot product scalar result"

corr_coef = xnorm · ynorm ; "· dot product scalar result"
XNORM = FFT(xnorm)
YNORM = FFT(ynorm)
XMAG = |XNORM| ; "compute magnitude of each element of XNORM"
YMAG = |YNORM| ; "compute magnitude of each element of YNORM"
corr_phadj = Kt · XMAG · YMAG ; "phase-adjusted correlation coefficient"

$$YNORMADJ = \frac{YMAG \cdot XNORM}{XMAG};$$ "impose XNORM phase onto YNORM elements"

ynormadj = IFFT(YNORMADJ) ; "phase-adjusted ynorm,ready for blending"

Although it is important to avoid the effects of group-delay differences by correlating the envelopes of the analog and digital audio signals, it is also important to recognize that these envelopes contain no frequency information. Function CORRELATION_METRICS in block 148 of FIG. 12 cross-correlates the magnitudes of the input 44.1-ksps analog and digital audio signals (x on line 74 and y on line 76) in the frequency domain at the computed offset. If these frequency components are well correlated (i.e., the output correlation coefficient corr_phadj is sufficiently high), there can be a high degree of confidence that the time-offset measurement is correct. Note that input vector lengths are truncated to the largest power of two to ensure more efficient operation of the FFTs, and constant Kt is an FFT-dependent scale factor.

Standard time-domain normalized cross-correlation of the input audio signals x and y is also performed at lag value offset by function CORRELATION_METRICS, yielding the output corr_coef. The value of corr_coef can be used to predict the sound quality of the blend. As previously noted, however, corr_coef will likely yield ambiguous results if analog/digital audio processing differs. This would not be the case, however, if the phase of the digital audio input were somehow reconciled with the analog phase prior to correlation. This is achieved in CORRELATION_METRICS by impressing the phase of the analog audio signal onto the magnitude of the digital signal. The resulting phase-adjusted digital audio signal ynormadj could then be temporarily substituted for the input digital audio y during blend ramps to improve sound quality.

Finally, cross-correlation of xbass on line 98 and ybass on line 100 is performed by function CORRELATE_BASS in block 140 of FIG. 12 at the peak offset value to form output variable peakbass. This measure indicates how well the phase of the bass audio frequencies is aligned with the higher frequencies. If the peakbass value is negative, then the analog or digital audio signal may be inverted. Output peakbass could be used to detect potential phase inversion, to validate the time-offset measurement, or to improve blend quality.

Exemplary pseudocode of the function CORRELATE_BASS called by meas_offset is as follows.

Function[peakbass] = CORRELATE_BASS(xbass,ybass,lagpqabs)
"cross - correlate shorter vector xbass over longer vector ybass at single lag value lagpqabs"
lag = round(lagpqabs)

-continued

```
Kb = length(xbass)
Sxx = xbass · xbass; "vector dot product, scalar result for normalization of xbass"
y = subvector(ybass,lag...lag + Kb − 1); "elect xbass-sized segment of ybass starting at lag"
Syy = y · y; "normalization of y"
Sxy = xbass · y
```

$$\text{peakbass} = \frac{\text{Sxy}}{\sqrt{\text{Sxx} \cdot \text{Syy}}};$$ "Cross-correlation at peak tag value"

Return values peakabs, offset, and corr_phadj of function meas_offset are all used by the executive MEAS_TIME_ALIGNMENT for validating the time-offset measurement.

The steps used to implement the time-offset measurement algorithm are delineated in the executive pseudocode of MEAS_TIME_ALIGNMENT. The time offset is computed in several stages from coarse (envelope) to fine correlation, with interpolation used between stages. This yields an efficient algorithm with sufficiently high accuracy. Steps 1 through 8 describe the filtering operations defined in the signal-flow diagram of FIG. 5.

[xenv, yenv, xabsf, yabsf, xbass, ybass]=filter_vectors(x, y)

Steps 10 through 15 describe the correlation operations defined in the signal-flow diagram of FIG. 12.

[peakabs, offset, corr_coef, corr_phadj, ynormadj, peakbass]=meas_offset(x, y, xenv, yenv, xabsf, yabsf, xbass, ybass, lagmin, lagmax)

Step 1—Pre-compute the filter coefficients for each of the four constituent filters in the filter_vectors function defined in the signal-flow diagram of FIG. 5. The xbass and ybass signals are available for further processing on lines 98 and 100.

The number of coefficients for each filter (Klpf, Kbass, Kabs, and Kenv) is defined in FIG. 5. The filter coefficients are computed by the function compute_LPF_coefs defined above.

hlpf=compute_LPF_coefs(Klpj)
hbass=compute_LPF_coefs(Kbass)
habs=compute_LPF_coefs(Kabs)
henv=compute_LPF_coefs(Kenv)

Step 2—Prepare monophonic versions of the digital and analog audio streams sampled at 44.1 ksps. It is recommended that the audio be checked for possible missing digital audio frames or corrupted analog audio. Capture another audio segment if corruption is detected on the present segment. Form x and y input vectors. The y vector consists of N digital audio samples. The x vector consists of M<N analog audio samples which are nominally expected to align near the center of they vector.

Step 3—Filter and decimate by rate R=4 (11,025-Hz output sample rate) both analog and digital audio (x and y) to produce new vectors xlpf and ylpf, respectively. The filter output is computed by the FIR filter function LPF defined in the above pseudocode LPF for performing filter processing.

xlpf=LPF(x,hlpf,R)
ylpf=LPF(y,hlpf,R)

Step 4—Filter vectors xlpf and ylpf to produce new vectors xbass and ybass, respectively. The filter output is computed by the FIR filter function LPF defined in the above pseudocode LPF for performing filter processing.

xbass=LPF(xlpf,hbass,1)
ybass=LPF(ylpf,hbass,1)

Step 5—Delay vector xlpf by D=(Kbass−1)/2 samples to accommodate bass FIR filter delay. Then subtract vector xbass from the result to yield new vector xbpf Similarly, subtract vector ybass from ylpf (after delay of D samples) to yield new vector ybpf. The output vectors xbpf and ybpf have the same lengths as vectors xbass and ybass.

$xbpf_m = xlpf_{m+D} - xbass_m$; for m=0 . . . length(xbass)−1
$ybpf_n = ylpf_{n+D} - ybass_n$; for n=0 . . . length(ybass)−1

Step 6—Create new vectors xabs and yabs by computing the absolute values of each of the elements of xbpf and ybpf $xabs_m = |xbpf_m|$, for m=0 . . . length(xbpf)−1
$yabs_n = |ybpf_n|$, for n=0 . . . length(ybpf)−1

Step 7—Filter vectors xabs and yabs to produce new vectors xabsf and yabsf, respectively. The filter output is computed by the FIR filter function LPF defined in the above pseudocode LPF for performing filter processing.

xabsf=LPF(xabs,habs,1)
yabsf=LPF(yabs,habs,1)

Step 8—Filter and decimate by rate Renv=32 (344.53125-Hz output sample rate) both analog and digital audio (xabsf and yabsf) to produce new vectors xenv and yenv, respectively. The filter output is computed by the FIR filter function LPF defined in the above pseudocode LPF for performing filter processing.

xenv=LPF(xabsf,henv,Renv)
yenv=LPF(yabsf,henv,Renv)

Step 9—Compute the lag range for the coarse envelope correlation.

lagmin=0
lagmax=length(yenv)−length(xenv)

Step 10—Use the CROSS_CORRELATE function defined above to compute coarse envelope correlation-coefficient vectors from input vectors xenv and yenv over the range lagmin to lagmax. Find the correlation maximum peakenv and the quadratic interpolated peak index lagpqenv. If the measurement is determined invalid, control is returned to the executive and processing continues with the next measurement vector of analog and digital audio samples. Note that efficient computing can eliminate redundant computations.

[peakenv, lagpqenv]=CROSS_CORRELATE(xenv, yenv, lagmin, lagmax)

Step 11—Compute the lag range for the fine correlation of xabsf and yabsf. Set the range ±0.5 samples around lagpqenv, interpolate by Renv, and round to integer sample indices.

lagabsmin=round[Renv·(lagpqenv−0.5)]
lagabsmax=round[Renv·(lagpqenv+0.5)]

Step 12—Use the CROSS_CORRELATE function defined above, to compute fine correlation coefficient vectors from input vectors xabsf and yabsf over the range lagabsmin to lagabsmax. Find the correlation maximum peakabs and the quadratic interpolated peak index lagpqabs. If the measurement is determined invalid, control is returned to the executive and processing continues with the next measurement vector of analog and digital audio samples. Note that efficient computing can eliminate redundant computations. Although the time offset is determined to be lagpqabs, additional measurements will follow to further improve the confidence in this measurement.

[peakabs, lagpqabs]=CROSS_CORRELATE(xabsf, yabsf, lagabsmin, lagabsmax)

Step 13—Use the CORRELATE_BASS function defined above, to compute correlation coefficient peakbass from input vectors xbass and ybass at index lagpqabs.

peakbass=CORRELATE_BASS(xbass, ybass, lagpqabs)

Step 14—Compute the offset (in number of 44.1-ksps audio samples) between the analog and digital audio vectors x and y. This is achieved by interpolating fine peak index lagpqabs by R=4 and rounding the result to integer samples.

offset=round[R·lagpqabs]

Step 15—Use the CORRELATION_METRICS function defined above to compute the correlation value corr_coef between the 44.1-ksps analog and digital audio input vectors x and y at the measured peak index offset. The frequency-domain correlation value corr_phadj is also computed after aligning the group delays of the x and y vectors. This is used to validate the accuracy of the time-offset measurement. Finally, this function generates phase-adjusted digital audio signal ynormadj, which can be temporarily substituted for the input digital audio y during blend ramps to improve sound quality.

[corr_coef, corr_phadj, ynormadj]=CORRELATION_METRICS(x, y, offset)

Figure 13:
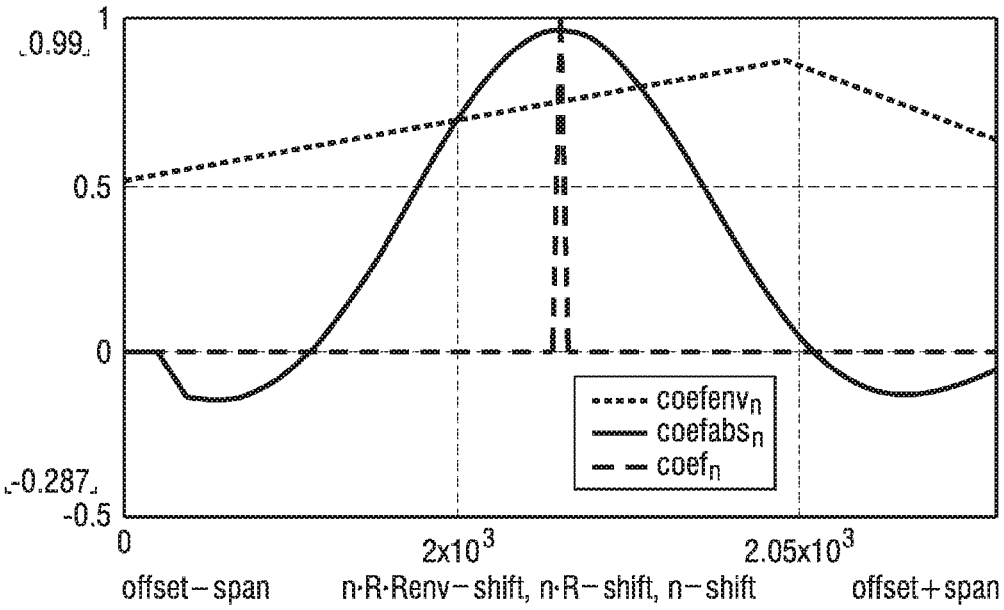
FIG. 13 is a graph of various cross-correlation coefficients.

Exemplary coarse (env), fine (abs), and input audio (x, y) cross-correlation coefficients are plotted together in FIG. 13.

The time-offset measurement technique described above was modeled and simulated with a variety of analog and digital input audio sources. The simulation was used to empirically set decision thresholds, refine logical conditions for validating correlation peaks, and gather statistical results to assess performance and compare with other automatic time-alignment approaches.

A test vector was input to the simulation and divided into multiple fixed-length blocks of analog and digital audio samples. Each pair of sample blocks was then correlated and the peak value and index were used to measure the time offset. This process was repeated for all constituent sample blocks within the test vector. The results were then analyzed and significant statistics were compiled for that particular vector.

Simulations were run on 10 different test vectors, with representative audio from various musical genres including talk, classical, rock, and hip-hop. All vectors applied different audio processing to the analog and digital streams, except for F−5+0+0CCC_Mono and F+0 to −9+0+0DRR.

Correlations (as defined in the algorithm description above) were performed on all constituent blocks within a test vector. Time offset and measurement time were recorded for valid correlations. The results were then analyzed and statistics were compiled for each vector. These statistics are tabulated in Table 1.

Since actual time offset is often unknown, mean offset is not a very useful statistic. Instead, the standard deviation of the time offset over all sample blocks comprising a test vector provides a better measure of algorithm precision. Mean measurement time is also a valuable statistic, indicating the amount of time it takes for the algorithm to converge to a valid result. These statistics are bolded in Table 1.

The results of Table 1 indicate that algorithm performance appears to be robust. The average time-offset standard deviation across all test vectors is 4.2 audio samples, indicating fairly consistent precision. The average measurement time across all test vectors is 0.5 seconds, which is well within HD Radio specifications. In fact, the worst-case measurement time across all vectors was just 7.2 seconds.

It is evident from Table 1 that the algorithm yields a relatively large range of estimated time offsets for some test vectors. This range is probably accurate, and is likely caused by different audio processing and the resulting group-delay differences between the analog and digital audio inputs. Unfortunately, there is no way to know the actual time offset at any given instant in each of the test vectors. As a result, ultimate verification of the algorithm can only be achieved through listening tests when implemented on a real-time HD Radio receiver platform.

TABLE 1

Simulation Statistical Results

| | Time Offset (44.1-kHz samples) | | | | Measurement Time (seconds) | | | |
|---|---|---|---|---|---|---|---|---|
| Test Vector | Min | Max | Mean | Std Dev | Min | Max | Mean | Std Dev |
| NJ_9470 MHz | −1 | 4 | 2 | 1.3 | 0.2 | 2.4 | 0.4 | 0.3 |
| 109Vector | −197 | −149 | −178.3 | 10.6 | 0.2 | 4.3 | 0.7 | 0.7 |
| AM+0+0+0HRN | 7 | 20 | 12.5 | 2.7 | 0.2 | 7.2 | 1.1 | 1 |
| F-5+0+0CCC_Mono | −7 | −4 | −5 | 0.5 | 0.2 | 0.2 | 0.2 | 0 |
| F+0+0+0HuRuN_Mono | −7 | 14 | 6.9 | 4 | 0.2 | 2 | 0.4 | 0.3 |
| F+0+0+0TuTuN_Mono | −11 | 32 | 5.6 | 9.7 | 0.2 | 4.1 | 1 | 0.9 |
| F+0+0+0DuRuR_Mono | −19 | −3 | −9.3 | 2.6 | 0.2 | 2.2 | 0.4 | 0.3 |
| F+0+0+0DuRuC_Mono | −8 | 12 | 4.2 | 2.6 | 0.2 | 2.2 | 0.3 | 0.3 |
| F+0+0+0DuRuN_Mono | −10 | 28 | 6.3 | 6 | 0.2 | 3 | 0.6 | 0.5 |
| F+0to-9+0+0DRR | −10 | 1 | −3.6 | 2.4 | 0.2 | 0.9 | 0.2 | 0.1 |

In addition to providing automatic time alignment in HD Radio receivers, the described algorithm has other potential applications. For instance, the described algorithm could be used in conjunction with an audio blending method, such as that described in commonly owned U.S. patent application Ser. No. 15/071,389, filed Mar. 16, 2016 and titled "Method And Apparatus For Blending An Audio Signal In An In Band On-Channel Radio System", to adjust blend thresholds and inhibit blending when misalignment is detected. This provides a dynamic blend threshold control.

Figure 14:
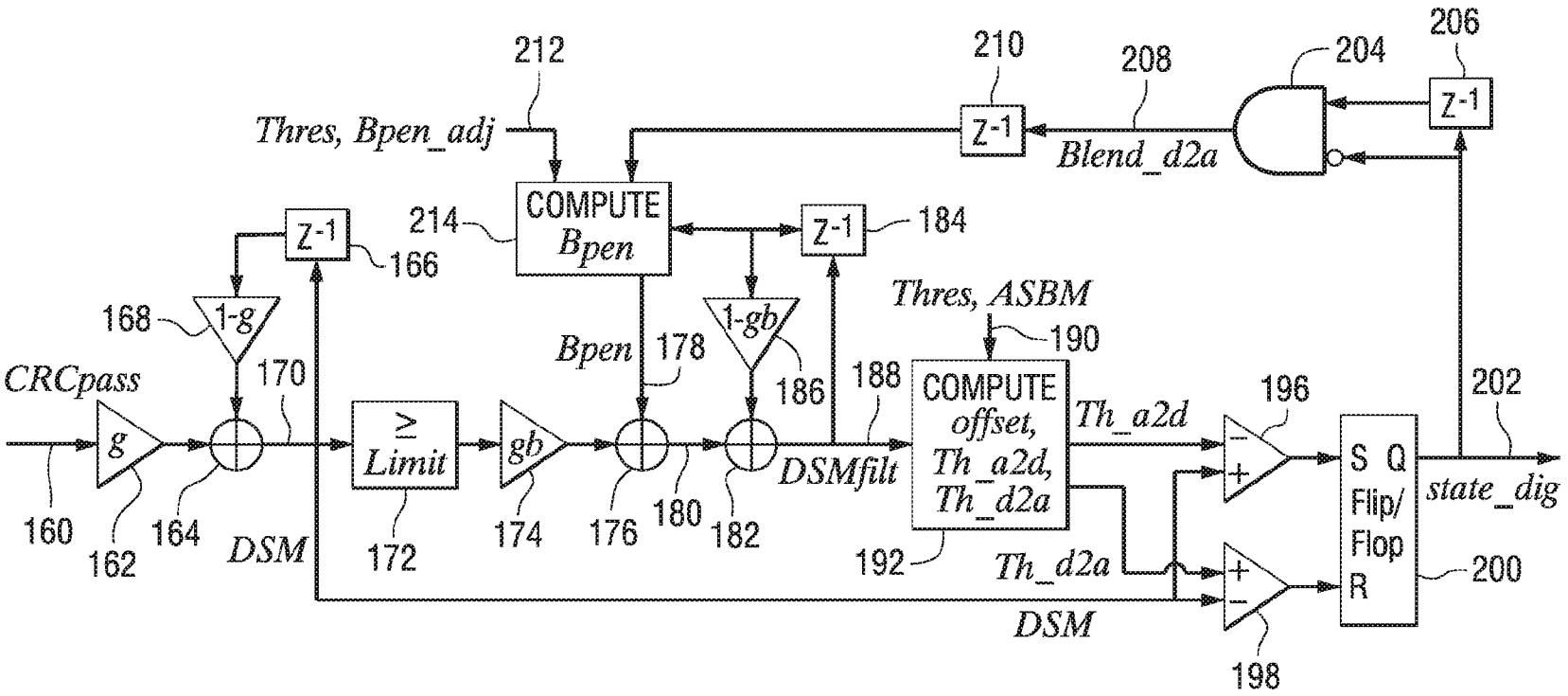
FIG. 14 is a signal-flow diagram of an audio blending algorithm with dynamic threshold control.

FIG. 14 is a signal-flow diagram of an audio blending algorithm with dynamic threshold control. A CRCpass signal on line 160 is amplified by amplifier 162 and passed to an adder 164. The output of the adder is delayed by delay block 166, amplified by amplifier 168 and returned to adder 164. This results in a digital signal measure (DSM) value on line 170. The DSM is limited in block 172, amplified by amplifier 174 and passed to adder 176, where it is added to a penalty signal Bpen on line 178. The resulting signal on line 180 passes to adder 182. The output of the adder 182 is delayed by delay block 184, amplified by amplifier 186 and returned to adder 182. This produces the DSMfilt signal on line 188. The DSMfilt signal is used in combination with the Thres and ASBM signals on line 190 to compute an offset and thresholds Th_a2d, and Th_d2a as shown in block 192. Th_a2d and Th_d2a are compared to DSM in comparators 196 and 198. The outputs of comparators 196 and 198 are used as inputs to flip flop 200 to produce a state dig signal on line 202. The state dig signal is sent to an inverting input of AND gate 204 and delay block 206 produces a delayed state dig signal for the other input of AND gate 204 to produce the Blend_d2a signal on line 208. The Blend_d2a signal is delayed by delay block 210 and used in combination with the Thres and Bpen_adj signals on line 212, and the delayed DSMfilt, to compute Bpen as shown in block 214.

The blend algorithm uses an Analog Signal Blend Metric (ASBM) to control its blend thresholds. The ASBM is currently fixed at 1 for MPS audio and 0 for SPS audio. However, the corr_coef or corr_phadj signal from the time-alignment algorithm could be used to scale ASBM on a continuum between 0 and 1. For instance, a low value of corr_coef or corr_phadj would indicate poor agreement between analog and digital audio, and would (with a few other parameters) scale ASBM and the associated blend thresholds to inhibit blending. Other alignment parameters that might be used to scale ASBM include level-alignment information, analog audio quality, audio bandwidth, and stereo separation.

In another embodiment, the time-offset measurement could also be used for automatic time alignment of the analog and digital audio signals in HD Radio hybrid transmitters. The offset (measured in samples at 44.1 ksps) can be filtered with a nonlinear IIR filter to improve the accuracy over a single measurement, while also suppressing occasional anomalous measurement results.

$$\text{offset_filt}_k=\text{offset_filt}_{k-1}+\alpha\cdot\max[-\text{lim},\ \min(\text{lim},\ \text{offset}_k-\text{offset_filt}_{k-1})]$$

where ±lim is the maximum allowed input offset deviation from the present filtered offset_filt value. The recommended value for lim should be somewhat larger than the typical standard deviation of the offset measurements (e.g., lim=8 samples). The lim nonlinearity suppresses the effects of infrequent anomalous measured offset values. The parameter $\alpha$ of the single-pole IIR filter is related to its natural time constant $\tau$ seconds.

$$\tau\cong P/\alpha$$

where P is the offset measurement period in seconds. For example, if $\alpha=1/16$ and P=3 seconds, then the IIR filter time constant is approximately 48 seconds. The time constant is defined as the response time to a step change in offset where the filtered output reaches $$1-\frac{1}{e}$$

(or about 63%) of the full step size, assuming the step size is less than ±lim. Step changes in time alignment offset are generally not expected; however, they could occur with changes in audio-processor settings.

The IIR filter reduces the standard deviation of the measured offset input values by the square root of $\alpha$. The filtered offset value can be used to track and correct the time-alignment offset between the analog and digital audio streams.

In another embodiment, the described algorithm could be use for processing of intermittent or corrupted signals.

The time-offset measurement algorithm described above includes suggestions for measurements with an intermittent or corrupted signal. Exception processing may be useful under real channel conditions when digital audio packets are missing (e.g., due to corruption) or when the analog signal is affected by multipath fading, or experiences intentional soft muting and/or bandwidth reduction in the receiver. The receiver may inhibit time-offset measurements if or when these conditions are detected.

There are several implementation choices that can influence the efficiency of the algorithm. The normalization components of the correlation-coefficient computation do not need to be fully computed for every lag value across the correlation vector. The analog audio normalization component (e.g., Suua and Suub in the pseudocode of the first function corr_coef_vectors called by CROSS_CORRELATE) remains constant for every lag, so it is computed only once. The normalization energy, mean, and other components of the digital audio vector and its subsequent processed vectors can be simply updated for every successive lag by subtracting the oldest sample and adding the newest sample. Furthermore, the normalization components could be used later in a level-alignment measurement.

Also, the square-root operation can be avoided by using the square of the correlation coefficient, while preserving its polarity. Since the square is monotonically related to the original coefficient, the algorithm performance is not affected, assuming correlation threshold values are also squared.

After the initial time offset has been computed, the efficiency of the algorithm can be further improved by limiting the range of lag values, assuming alignment changes are small between successive measurements. The size M of the analog audio input vector x could also be reduced to limit processing requirements, although using too small an input vector could reduce the accuracy of the time-offset measurement.

Finally, the phase-adjusted digital audio ynormadj computed in the CORRELATION_METRICS function could actually be calculated in a different function. This signal was designed to improve sound quality by temporarily substituting it for input digital audio during blend ramps. But since blends occur sporadically, it could be more efficient to calculate ynormadj only as needed. In fact, the timing of the ynormadj calculation must be synchronized with the timing of the blend itself, to ensure that the phase-adjusted samples are ready to substitute. As a result, careful coordination with the blend algorithm is required for this feature.

From the above description it should be apparent that various embodiments of the described method for aligning analog and digital signals can be used in various types of signal processing apparatus, including radio receivers and radio transmitters. One embodiment of the method includes: receiving or generating an analog audio stream and a digital audio stream; and using a normalized cross-correlation of envelopes of the analog audio stream and the digital audio stream to measure a time offset between the analog audio stream and the digital audio stream. The normalized cross-correlation of envelopes can be computed using a vector of bandpass samples of the analog audio stream and a vector of bandpass samples of the digital audio stream.

The described method can be implemented in an apparatus such as a radio receiver or transmitter. The apparatus can be constructed using known types of processing circuitry that is programmed or otherwise configured to perform the functions described above.

While the present invention has been described in terms of its preferred embodiments, it will be apparent to those skilled in the art that various modifications can be made to the described embodiments without departing from the scope of the invention as defined by the following claims.

What is claimed is:

1. A method [for processing a digital] *of operating an audio signal receiver to process an* audio [broadcast] signal [in a radio receiver] *that includes multiple audio streams*, the method comprising:

[receiving a hybrid broadcast signal;]

demodulating the [hybrid broadcast] *audio* signal to produce [an analog] *a first* audio *sample* stream *of the audio signal* and a [digital] *second* audio *sample* stream *of the audio signal*;

[using] *computing* a normalized cross-correlation of envelopes of the [analog] *first* audio *sample* stream and the [digital] *second* audio *sample* stream to measure a time offset between the [analog] *first* audio *sample* stream and the [digital] *second* audio *sample* stream *using audio processing circuitry of the audio signal receiver*;

*computing a coarse envelope cross-correlation over a first range of lag values to locate a vicinity of the time offset;*

*subsequently computing a fine envelope cross-correlation over a second range of lag values, wherein the second range of lag values is narrower than the first range of lag values;*

*producing an audio blend by* blending an output of the [radio] *audio signal* receiver from the [analog] *first* audio *sample* stream to the [digital] *second* audio *sample* stream or from the [digital] *second* audio *sample* stream to the [analog] *first* audio *sample* stream;

phase-adjusting the [digital] *second* audio *sample* stream; and using the phase-adjusted [digital] *second* audio *sample* stream to temporarily replace input [digital] audio frames during blend ramps used in the [blending] *audio blend* of the output of the [radio] *audio signal* receiver.

2. The method of claim 1, further comprising:

using the time offset to align the [analog] *first* audio *sample* stream and the [digital] *second* audio *sample* stream.

3. The method of claim 1, *wherein the first audio sample stream is an analog audio sample stream, and the method* further comprising:

using the time offset to scale an analog signal blend metric, to control blend thresholds in the blending of the output of the [radio] *audio signal* receiver, and to inhibit blending when misalignment is detected.

4. The method of claim 1, further comprising:

computing cross-correlation of bass signals to detect potential inversion, to validate time offset measurements, or to improve blend quality.

5. The method of claim 1, further comprising:

computing cross-correlation of the [analog] *first* audio *sample* stream and the [digital] *second* audio *sample* stream to predict sound quality of a potential *audio* blend.

6. The method of claim 1, wherein:

the normalized cross-correlation of envelopes is computed using a vector of bandpass samples of the [analog] *first* audio *sample* stream and a vector of bandpass samples of the [digital] *second* audio *sample* stream.

[7. The method of claim 1, wherein the step of using a normalized cross-correlation of envelopes of the analog audio stream and the digital audio stream to measure a time offset between the analog audio stream and the digital audio stream comprises:

using a coarse envelope cross-correlation computed over a first range of lag values to locate a vicinity of the time offset; and subsequently using a fine envelope cross-correlation computed over a second range of lag values, wherein the second range of lag values is narrower than the first range of lag values.]

8. The method of claim [7] *1*, further comprising: using quadratic interpolation of peak indices to improve resolution of a computed peak lag.

9. The method of claim 1, wherein the normalized cross-correlation of envelopes is computed using a vector of samples of the [analog] *first* audio *sample* stream and a vector of samples of the [digital] *second* audio *sample* stream; and the normalized cross-correlation of envelopes of the vector of samples of the [analog] *first* audio *sample* stream and the vector of samples of the [digital] *second* audio *sample* stream produces bifurcated and composite correlation peaks that are compared for correlation validation via temporal consistency.

10. The method of claim 1, wherein:

the normalized cross-correlation of envelopes is computed using a *first audio* vector of samples of the [analog] *first* audio *sample* stream and a *second audio* vector of samples of the [digital] *second* audio *sample* stream; and the normalized cross-correlation of envelopes of the [analog] *first* audio vector and the [digital] *second* audio vector produces current and previous peaks that are compared for correlation validation via temporal consistency.

11. The method of claim 1, further comprising:

calculating phase-adjusted frequency-domain correlation coefficients to validate the time offset.

12. [A radio] *An audio signal* receiver comprising:

processing circuitry configured:

to receive [a hybrid broadcast] *an audio* signal *that includes multiple audio streams*;

to demodulate the [hybrid broadcast] *audio* signal to produce [an analog] *a first* audio *sample* stream and a [digital] *second* audio *sample* stream;

to use a normalized cross-correlation of envelopes of the [analog] *first* audio *sample* stream and the [digital] *second* audio *sample* stream to measure a time offset between the [analog] *first* audio *sample* stream and the [digital] *second* audio *sample* stream;

to compute a coarse envelope cross-correlation over a first range of lag values to locate a vicinity of the time offset; and to subsequently compute a fine envelope cross-correlation over a second range of lag values, wherein the second range of lag values is narrower than the first range of lag values.

13. The [radio] *audio signal* receiver of claim 12, wherein the processing circuitry is further configured to use quadratic interpolation of peak indices to improve resolution of a computed peak lag.

14. The [radio] *audio signal* receiver of claim 12, wherein the processing circuitry is further configured:

to compute the normalized cross-correlation of envelopes using a vector of samples of the [analog] *first* audio *sample* stream and a vector of samples of the [digital] *second* audio *sample* stream to produce bifurcated and composite correlation peaks; and to compare the bifurcated and composite correlation peaks for correlation validation via temporal consistency.

15. The [radio] *audio signal* receiver of claim 12, wherein the processing circuitry is further configured:

to compute the normalized cross-correlation of envelopes using a vector of samples of the [analog] *first* audio *sample* stream and a vector of samples of the [digital] *second* audio *sample* stream to produce current and previous peaks; and to compare the current and previous peaks for correlation validation via temporal consistency.

16. The [radio] *audio signal* receiver of claim 12, wherein the processing circuitry is further configured to calculate phase-adjusted frequency-domain correlation coefficients to validate the time offset.

* * * * *